United States Patent [19]
Sunamoto et al.

[11] Patent Number: 5,739,498
[45] Date of Patent: Apr. 14, 1998

[54] METHOD OF AND APPARATUS FOR JOINING PLATE MEMBERS BY THE USE OF ANCHOR PEGS

[75] Inventors: Kenichi Sunamoto, Hiroshima; Naoki Sasaki, Hiroshima-ken, both of Japan

[73] Assignee: Akane Corporation, Hiroshima, Japan

[21] Appl. No.: 590,824

[22] Filed: Jan. 24, 1996

[51] Int. Cl.⁶ .................. B23K 11/00; B23K 9/28; B23K 11/10
[52] U.S. Cl. ............... 219/78.15; 219/86.1; 219/91.2
[58] Field of Search ............... 219/78.15, 86.1, 219/91.2, 93, 117.1, 94, 118; 228/135, 139, 175, 262.44; 29/450, 409.5, 512; 156/91

[56] References Cited

U.S. PATENT DOCUMENTS

| | | | |
|---|---|---|---|
| 2,620,539 | 12/1952 | Poupitch | 411/349 |
| 3,512,224 | 5/1970 | Newton | 411/447 |
| 3,711,347 | 1/1973 | Wagner et al. | 156/91 |
| 3,925,637 | 12/1975 | Becker | 219/105 |
| 3,944,777 | 3/1976 | Porat | 219/118 |
| 4,727,232 | 2/1988 | Omori et al. | 219/91.2 |
| 4,855,562 | 8/1989 | Hinden | 219/93 |
| 4,920,247 | 4/1990 | Ward et al. | 219/103 |
| 5,302,797 | 4/1994 | Yasuyama et al. | 219/118 |
| 5,304,769 | 4/1994 | Ikegami et al. | 219/119 |

FOREIGN PATENT DOCUMENTS

| | | |
|---|---|---|
| 57-190783 | 11/1982 | Japan . |
| 4-253578 | 9/1992 | Japan . |

*Primary Examiner*—Adolf Berhane
*Attorney, Agent, or Firm*—Morrison & Foerster LLP

[57] ABSTRACT

A method of joining a first electroconductive plate member made of metal to a second electroconductive plate member made of metal dissimilar to the metal for the first plate member by the use of at least one anchor peg made of the same metal as the second plate member. The first and second plate members are initially overlapped one above the other to provide a plate assembly which is subsequently clamped under pressure between welding electrodes with the anchor peg positioned between one of the welding electrodes and the first plate member. Thereafter, an electric current is supplied to the welding electrodes to initially cause a portion of the first plate member held in contact with the anchor peg to melt by resistance-heating of the anchor peg to thereby allow the anchor peg to be pierced through the first plate member and then to cause the anchor peg extending completely across a thickness of the first plate member to be welded to the second plate member.

13 Claims, 4 Drawing Sheets

5,739,498

METHOD OF AND APPARATUS FOR JOINING PLATE MEMBERS BY THE USE OF ANCHOR PEGS

BACKGROUND OF THE INVENTION 1. (Field of the Invention)

The present invention generally relates to connection of dissimilar metal plate members both having an electroconductive property and, more particularly, to a method of joining a first metal plate member such as, for example, an aluminum plate, to a second metal plate member made of a metal dissimilar in quality from and other than aluminum. The present invention also pertains to a welding apparatus capable of carrying out the joining method referred to above.

2. (Description of the Prior Art)

The technique of accomplishing metallurgical connection between dissimilar metal plate members in which regions of joint of those dissimilar metal plate members are fused has been considered generally impractical partly because the dissimilar metals forming those plate members to be joined together have different melting points and/or different coefficients of linear expansion and partly because the fusion is accompanied by formation of an intermetallic compound at the interface between the dissimilar metal plates. Accordingly, traditional rivetting and/or bolting techniques are generally employed to accomplish physical connection between the dissimilar metal plates.

The traditional rivetting or bolting technique requires not only perforations to be formed in one of the plate members, but also positioning or alignment of rivets or bolts relative to the perforations so formed, resulting in a substantial amount of labor to be executed to finish the connection.

The Japanese Laid-open Patent Publication No. 4-253578 published in 1992, for example, discloses a method of joining an aluminum plate and a stainless steel plate together through a clad metal sheet intervening therebetween. According to this prior art method, the use is made of the clad metal sheet manufactured in the form of a composite plate having aluminum and stainless steel layers on respective sides thereof. This clad metal sheet is sandwiched under pressure between the aluminum and stainless steel plated with the aluminum and stainless steel layers held in contact with the aluminum and stainless steel plates so that the aluminum and stainless steel layers of the clad metal sheet can be welded to the aluminum and stainless steel plates, respectively.

The Japanese Laid-open Patent Publication No. 57-190783 published in 1982 discloses a method of connecting an electroconductive plate and a non-electroconductive plate together by the use of one or more conical pegs of electroconductive material. According to this method, while the conical peg is fitted to one of welder electrodes of a resistance welding machine or is temporarily driven in the non-electroconductive plate, the electroconductive and non-electroconductive plates overlapped one above the other are held between the welder electrodes and one of the welder electrodes adjacent the non-electroconductive plate is driven towards the plate assembly to cause the conical metal peg to pierce through the non-electroconductive plate until the apex of the or each conical metal peg is brought into contact with the electroconductive plate. An electric current is then supplied so as to flow between the conical metal peg and the electroconductive plate to cause the apex of the or each conical metal peg to be welded to the electroconductive plate, thereby completing the connection of the non-electroconductive plate to the electroconductive plate. This publication describes the use of a steel plate and a synthetic resinous plate for the electroconductive plate and the non-electroconductive plate, respectively. This publication also describes the conical metal petal peg of a shape including a flange protruding radially outwardly from the base of the conical shape of the metal meg.

Although both of those prior art methods require neither the perforating process nor the positioning or alignment process, they have their own disadvantages. Specifically, according to the first mentioned publication, the use of the clad metal sheet having dissimilar metal regions compatible respectively with dissimilar metal plates to be joined together is essential, or the dissimilar metal plates cannot otherwise be joined together satisfactorily.

On the other hand, according to the second mentioned publication, the method disclosed therein is exclusively applicable where electroconductive and non-electroconductive plates are to be joined together, and is inapplicable where both of the plates to be joined together is made of electroconductive material or have an electroconductive property. In addition, this method requires the non-electroconductive plate to be pierced by the or each conical metal peg by application of an external pressure from one of the welder electrodes and, therefore, during execution of the welding method it may occur that cracking may take place in the non-electroconductive plate in the vicinity of and around the metal peg being pushed.

Irrespective of the manner in which the first and second dissimilar metal plates are joined together, it is well recognized that, if the plate assembly has a gap formed between the first and second plates and a liquid electrolyte such as water penetrates into and is retained in such gap, an electrolytic corrosion will eventually occur. To avoid this possible electrolytic corrosion, a sealing material such as, for example, one or more gaskets are employed to avoid ingress of the liquid electrolyte, and/or at least one of the plates is applied with an electrically insulating paint material before the plates are joined together.

Where the sealing material is employed to avoid ingress of the liquid electrolyte into the gap between the plates, a rather complicated procedure is required to align and position the sealing material relative to the joint eventually formed between the plates. The painting of one of the plates before they are joined together would not warrant a comfortable-to-look finish since a paint film may be burned or peeled when the plates are being joined or have been joined together.

In certain application, painting is necessitated after the plates have been joined together. Accordingly, where the dissimilar metal plates are joined together with a gap defined therebetween, the possible occurrence of electrolytic corrosion would be advantageously avoided if paint is applied not only to at least one of the plates forming the plate assembly, but also a region of joint in the plates. To create the gap between the plates, it may be contemplated to use a spacer and this is particularly true where the plates are rivetted or bolted together. The use of the spacer to form the gap has been found advantageous in that since the spacer and portions of the plates in the vicinity of the spacer may be deformed when a high joining force is applied, a proper bond strength can be obtained between the plates.

SUMMARY OF THE INVENTION

Accordingly, the present invention has been devised to substantially eliminate the problems inherent in the prior art methods of joining the plate members and is intended to provide an improved method effective to join dissimilar metal plate members together satisfactorily.

Another important object of the present invention is to provide the joining method of the type referred to above, wherein a gap can be formed between the dissimilar metal plate members with no use of any spacer and which does not require the use of any sealing material hitherto used to avoid any possible electrolytic corrosion.

According to a broad aspect of the present invention, there is provided a method of joining a first electroconductive plate member to a second electroconductive plate member, said first and second plate members being prepared from respective metals dissimilar from each other, by the use of at least one anchor peg made of the same metal as the second plate member. The first and second plate members are initially overlapped one above the other to provide a plate assembly which is subsequently clamped under pressure between welding electrodes with the anchor peg positioned between one of the welding electrodes and the first plate member. Thereafter, an electric current is supplied to the welding electrodes to initially cause a portion of the first plate member held in contact with the anchor peg to melt by resistance-heating of the anchor peg to thereby allow the anchor peg to be pierced through the first plate member and then to cause the anchor peg extending completely across a thickness of the first plate member to be welded to the second plate member.

Preferably, the electric current is adjusted to provide a piercing current of a first value necessary to cause the anchor peg to be pierced through the first plate member and a welding current of a second value necessary to cause the anchor peg to be welded to the second plate member. in a preferred embodiment of the present invention, the first value of the piercing current is lower than, e.g., half the second value of the welding current.

The first and second plate members may be made of aluminum and ferrous materials, respectively. Specifically, so far as the anchor peg is made of the same material as that for the second plate member, the first plate member be made of metal dissimilar to and having a melting point lower than that of the metal used to make the second plate member.

During the joining, a portion of the anchor peg contacts the first plate member when the anchor peg is pierced through the first plate member. If desired, to avoid any possible formation of an intermetallic compound, that portion of the anchor peg may be either electroplated or provided with a tubular protective sheath mounted on said portion of the anchor peg to thereby suppress a bonding reaction taking place between the anchor peg and the first plate member.

According to a specific embodiment of the present invention, a plurality of surface protuberances are formed on one of opposite surfaces of one of the first and second plate members by the use of, for example, a press work, so that the resultant plate assembly can have a gap between the first and second plate members.

The present invention also provides a welding apparatus capable of executing the joining method discussed above.

In any event, according to the present invention, when the plate assembly including the first and second plate members in overlapped relation to each other is clamped under pressure between welding electrodes with the anchor peg positioned between one of the welding electrodes and the first plate member, an electric current is supplied to the welding electrodes. By the application of the electric current, a portion of the first plate member held in contact with the anchor peg is initially melted by resistance-heating of the anchor peg to thereby allow the anchor peg to be pierced through the first plate member. This appears to be possible because a metal used to manufacture the anchor peg has a melting point higher than the first plate member. The anchor peg having pierced across the thickness of the first plate member is then brought into contact with the second plate member and is subsequently be welded to the second plate member to thereby complete the joining of the first and second plate members together.

Formation of the surface protuberances on one of the first and second plate members is advantageous in that the gap can naturally be defined between the first and second plate members when the joining of those plate members completes. Neither sealing material nor spacer is needed.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which.

DETAILED DESCRIPTION OF THE EMBODIMENT

The principle of our invention will first be described as applied to connection of first and second plate members of dissimilar metals, both having an electroconductive property, with reference to FIGS. 1 to 7. It is also to be noted that, to facilitate quick and easy understanding of the present invention, the first and second dissimilar metal plate members are assumed to be aluminum and iron plates W1 and W2, respectively.

Figure 1A:
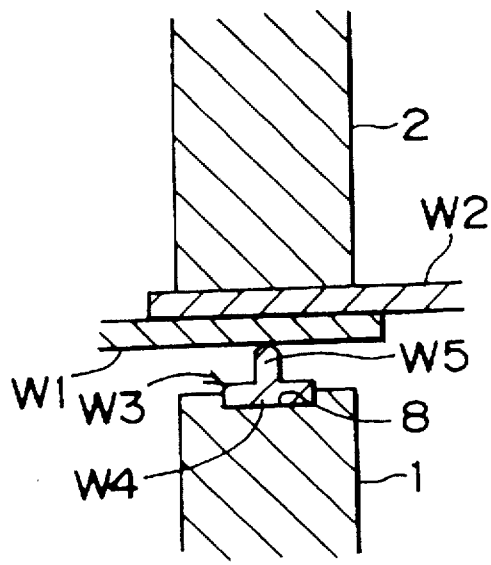
FIGS. 1A to 1C are schematic longitudinal sectional views showing sequential steps of connecting first and second plate members together, respectively, while they are sandwiched between welder electrodes.
Figure 1B:
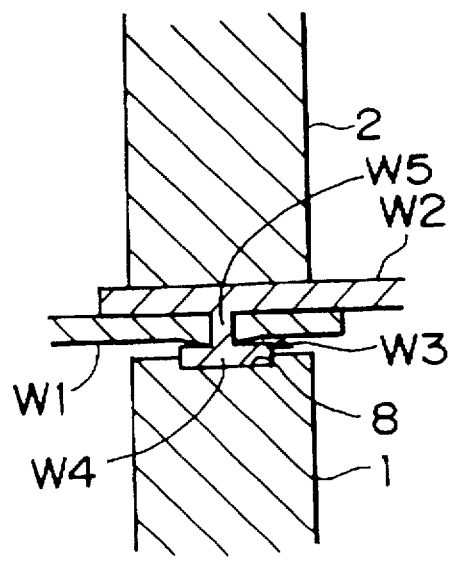
Figure 1C:
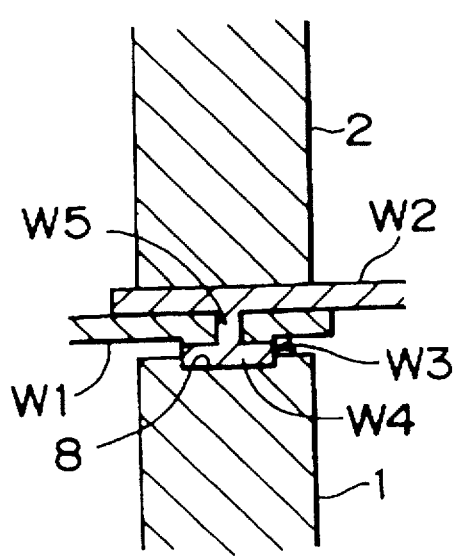

As shown in FIGS. 1A to 1C, to connect the aluminum and iron plates W1 and W2 together, the use is made of at least one anchor peg W3 made of an electroconductive material identical with the material for the second plate, that is, iron. This anchor peg W3 is shown on an enlarged scale in FIG. 2 and includes a connecting portion or shank W5 having a lower end formed with a radially outwardly extending flange W4 and the other end tapered axially outwardly. By the reason which will be described later, the anchor peg W3 may have a protective sheath shown by the phantom line W6 in FIG. 2 as mounted around the body of the connecting portion W5 and made of the same material as material for the anchor peg W3.

Figure 4:
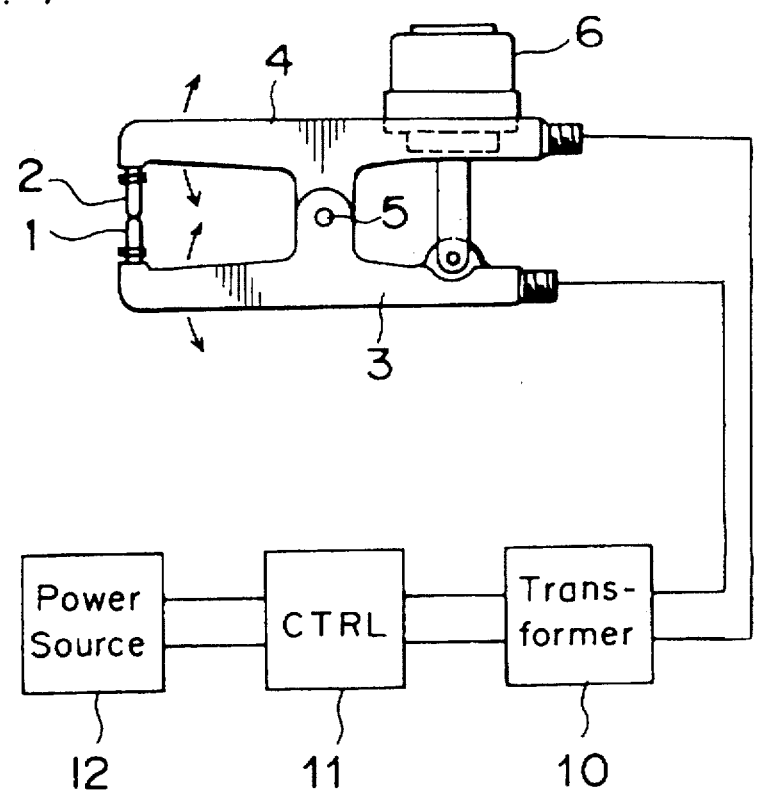
FIG. 4 is a schematic diagram showing a resistance welding machine which may be employed in the practice of the present invention.

A welding machine which can be employed in the practice of the joining method of the present invention may be generally identical with any known resistance spot welding machine, except for the details of welder electrodes and a power supply control system both of which must be modified to suit to the joining method of the present invention. More specifically, as shown in FIG. 4, the welding machine employable in the practice of the joining method of the present invention comprises lower and upper arms 3 and 4 pivotally connected together by means of a pivot pin 5, and lower and upper electrodes 1 and 2 fixedly mounted on respective ends of the lower and upper arms 3 and 4 in alignment with each other. An pneumatically operated cylinder 6 having a piston rod is mounted atop one end of the upper arm 4 remote from the upper electrode 2 with the piston rod pivotally coupled with one end of the lower arm 3 remote from the lower electrode 1 such that, when the cylinder 6 is driven to retract or project the piston rod, the lower and upper electrodes 1 and 2 can be separated away from or brought close to each other. It is to be noted that the cylinder 6 may be of a type having the piston rod spring-biased to a retracted position.

As best shown in FIGS. 1A to 1C, the lower electrode 1 has an upper surface inwardly recessed at 8 to provide a peg seat of a shape complemental to the outer shape of the flange W4 of the anchor peg W3, said peg seat 8 having a depth preferably about half the thickness of the flange W4 so that, when the welding machine is in use, the anchor peg W3 can be placed on and supported by the lower electrode 1 with the connecting portion W5 extending upwardly towards the upper electrode 2.

Placement of the anchor peg W3 on the lower electrode 1 is carried out when the lower and upper electrodes 1 and 2 are separated away from each other, followed by placement of the aluminum and iron plates W1 and W2 between the lower and upper electrodes 1 and 2 in a manner which will now be described in detail. While the lower and upper electrodes 1 and 2 are separated away from each other with the anchor peg W3 placed atop the lower electrode 1, the aluminum and iron plates W1 and W2 are inserted in between the tapered end of the anchor peg W3 on the lower electrode 1 and a lower end of the upper electrode 2, with the aluminum plate W1 positioned below the iron plate W2 and held in contact with the tapered end of the anchor peg W3, substantially as shown in FIG. 1A. After the placement of the aluminum and iron plates W1 and W2 in position between the lower and upper electrodes 1 and 2, the cylinder 6 is driven to project the piston rod, causing the lower and upper electrodes 1 and 2 to be brought close to each other to thereby apply a predetermined pressure to the overlapped plates W1 and W2 through the anchor peg W3 as shown in FIG. 1A. While this condition is maintained, an electric current is supplied to the electrodes 1 and 2 from an electric power source 12 shown in FIG. 4 in a manner as will be described later.

Figure 3:
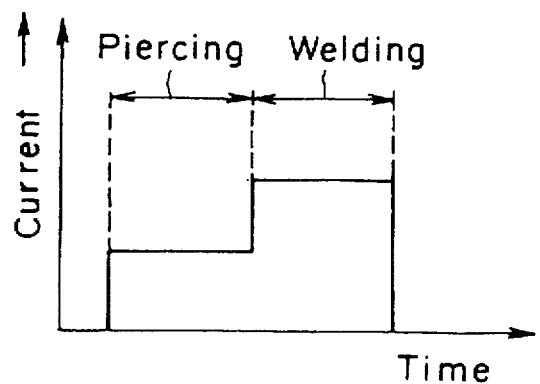
FIG. 3 is a characteristic graph showing the welding current that varies with passage of time during the practice of the method of the present invention.

As shown in FIG. 4, the lower and upper welder electrodes 1 and 2 are electrically connected with the electric power source 12 through a welder transformer 10 and a welder control unit 11. The control unit 11 is operable to control the duration of supply of and the amount of the welding current that must flow between the welder electrodes 1 and 2 across the work sandwiched between the welder electrodes 1 and 2 and including the overlapped plates W1 and W2 and the anchor peg W3. More specifically, the control unit 11 is so designed as to supply the welding current of a waveform as shown in FIG. 3 wherein the welding current is of an initial value for a first predetermined length of time during which a portion of the aluminum plate W1 aligned with the anchor peg W3 is pierced by the anchor peg W3 and is subsequently increased to a value higher than the initial current value for a second predetermined length of time during which the anchor peg W3 having pierced through the aluminum plate W1 is welded to the iron plate W2. Preferably, the initial welding current necessary to cause the anchor peg W3 to be pierced through the aluminum plate W1 (which current is hereinafter referred to as piercing current) is about one half of the subsequent welding current necessary to weld the anchor peg W3 to the iron plate W2.

The reason that the anchor peg W3 can be pierced through the aluminum plate W1 when the piercing current is supplied to the welder electrodes 1 and 2 is because a metal used to manufacture the anchor peg W3 has a melting point higher than the aluminum plate W1. Therefore, during the resistance heating, that portion of the aluminum plate W3 aligned with the anchor peg W3 is melted earlier than the anchor peg W3 to allow the latter to be pierced through the aluminum plate W3 until the tapered end of the anchor peg W3 emerges outwardly from a surface of the aluminum plate W3 that is held in contact with the iron pate W2. In this respect, the piercing current may suffice if during the resistance heating it brings about a heat quantity required to melt aluminum.

By way of example, where for use as inner and outer panels of an automobile bonnet or hood a plate assembly comprising an aluminum plate W1 and an iron plate W2 joined together in face-to-face relation by the use of a plurality of anchor pegs W3 is desired to be assembled, the piercing current is preferably within the range of 2,000 to 4,000 A/mm$^2$ with the pressure of 30 to 100 Kg/mm$^2$ applied to urge each anchor peg W3 towards the aluminum plate W1, provided that the aluminum plate W1 and the iron plate W2 have a thickness within the range of 0.6 to 1.5 mm and each of anchor pegs W3 has a connecting portion W5 of a diameter within the range of 1.5 to 3 mm, and also provided that the duration of supply of the piercing current between the welder electrodes 1 and 2 during the piercing of each anchor peg W3 is within the range of 3 to 8 cycles (one cycle equals to 1/60 second), i.e., 3/60 to 8/60 second.

If the piercing current is lower than 2,000 A/mm$^2$, the anchor peg W3 being resistance-heated will fail to provide a sufficient quantity of heat and will not therefore be pierced through the aluminum plate W1. On the other hand, if the piercing current is higher than 4,000 A/mm$^2$, an excessive binding reaction between the anchor peg W3 and the aluminum plate W3 which leads to formation of a fragile intermetallic compound will occur, resulting in reduction in bond strength. Also, if the pressure applied to the anchor peg W3 then sandwiched between the welder electrodes 1 and 2 through the plate assembly is lower than 30 Kg/mm$^2$, then, the pressure of this magnitude is insufficient to allow that portion of the aluminum plate W1 to be pierced, but if the pressure is higher than 100 Kg/mm², the pressure of this magnitude will be so excessive that the anchor peg W3 may be deformed before it is completely pierced through the aluminum plate W1.

Assuming that the anchor peg W3 has been pierced satisfactorily through the aluminum plate W1, the higher welding current, that is, the welding current required for the anchor peg W3 to be welded to the iron plate W2, is preferably within the range of 3,000 to 8,000 A/mm², provided that the duration of supply of the higher welding current between the welder electrodes 1 and 2 during the actual welding the anchor peg W3 to the iron plate W2 is within the range of 6 to 14, i.e., 6/60 to 14/60 second. The pressure applied to urge each anchor peg W3 towards the iron plate W3 may preferably be the same as that applied during the piercing of the anchor peg W3 through the aluminum plate W1, that is, within the range of 30 to 100 Kg/mm².

If the higher welding current is lower than 3,000 A/mm², the anchor peg W3 being resistance-heated will fail to provide a sufficient quantity of heat and will not therefore be welded to the iron plate W2. On the other hand, if the higher welding current is higher than 8,000 A/mm², well recognized weld defects resulting from application of an excessive welding current will occur such as melt down, blowholes, reduction in strength, expulsion and surface flash and so on. If the pressure is lower than 30 Kg/mm², then, the pressure of this magnitude is insufficient to allow the anchor peg W3 to be satisfactorily welded to the iron plate W2, but if the pressure is higher than 100 Kg/mm², the pressure of this magnitude will be so excessive that the anchor peg W3 may be deformed to such an extent as to diminish a welding margin, accompanied by reduction in strength and increase of weld expulsion and surface flash.

The method of the present invention for joining the aluminum plate W1 to the iron plate W2 through the anchor peg W3 by the use of the welding machine of the type discussed above will now be described with particular reference to FIGS. 1A to 1C.

At the outset, the cylinder 6 should be actuated to separate the welder electrodes 1 and 2 on the respective arms 3 and 4 to provide a space for accommodating the plate assembly. Specifically, with the welder electrodes 1 and 2 separated away from each other, the anchor peg W3 is mounted on the lower welder electrode 1 with the flange W4 thereof seated in the peg seat 8 and with the connecting portion W5 thereof oriented towards the upper welder electrode 2.

Then, as shown in FIG. 1A, the plate assembly including the aluminum plate W1 and the iron plate W2 overlapped above the aluminum plate W1 is disposed in between the anchor peg W3 and the upper welder electrode 2 with the aluminum plate W1 oriented downwardly towards the anchor peg W3. After a portion of the aluminum plate W1 where the anchor peg W3 is desired to be pierced is aligned with the tapered end of the anchor peg W3, the cylinder 6 is again actuated to retract the piston rod to cause the plate assembly to be sandwiched between the anchor peg W3 on the lower welder electrode 1 and the upper welder electrode 2 to thereby hold the plate assembly under pressure between the lower and upper welder electrodes 1 and 2.

After the plate assembly has been so sandwiched, the welding current is supplied from the power source 12 to the welder electrodes 1 and 2 through the control unit 11 and then though the welder transformer 10. At the outset, the welding current supplied is the piercing current required to perform the process of causing the anchor peg W3 to be pierced through the aluminum plate W1. Specifically, supply of the piercing current to the lower and upper welder electrodes 1 and 2 results in resistance heating of the anchor peg W3 to a temperature sufficient to melt that portion of the aluminum plate W1 substantially as shown in FIG. 1B and, therefore, the anchor peg W3 is, while urged by the pressure applied thereto through the welder electrodes 1 and 2, pierced completely across the thickness of the aluminum plate W1 with the tapered end of the anchor peg W3 consequently brought into contact with the iron plate W2.

The process of piercing the aluminum plate W1 with the anchor peg W3 is immediately followed by a process of welding the anchor peg W3 to the iron plate W2. During this welding process, the welding current flowing between the lower and upper electrodes 1 and 2 across the plate assembly is increased to provide the higher welding process referred to hereinbefore while the pressure applied to the anchor peg W3 remains the same as that during the piercing process. By the supply of this higher welding current, both of the anchor peg W3 and the iron plate W2 are resistance-heated to fuse. As this fusion proceeds, an end portion of the connecting portion W5 of the anchor peg W3 including the tapered end thereof melts into a portion of the iron plate W2 aligned therewith with the length of the connecting portion W5 consequently reduced to achieve a resistance welding. The resistance welding completes when the flange W4 of the anchor peg W3 is brought into contact with an outer surface of the aluminum plate W1 remote from the iron plate W2 as shown in FIG. 1C.

As clearly shown in FIG. 1C, when and after the weld joint has been solidified, the aluminum plate W1 is firmly sandwiched between the flange W4 of the anchor peg W3 and the iron plate W2 welded with the connecting portion W5 and, thus, the iron plate W2 and the aluminum plate W2 are integrated together through the anchor peg W3.

As discussed above, according to the present invention, the anchor peg W3 used to join the aluminum and iron plates W1 and W2 together is heated to provide the heat with which that portion of the aluminum plate W1 is melted to allow the anchor peg W3 to be pierced across the thickness of the aluminum plate W1 during the piercing process and subsequently, during the welding process, the anchor peg W3 is welded by resistance heating to the iron plate W2 with the aluminum plate W1 firmly sandwiched between the flange W4 and the iron plate W2. Neither perforation in anticipation of rivetting or bolting nor alignment with any rivet or bolt with the perforation is needed in the practice of the present invention, and joining of the plate members of dissimilar metals together can easily be accomplished.

In addition, since the piercing of the anchor peg W3 through the aluminum plate W1 takes place during that portion of the aluminum plate W1 having been melted, no cracking which would occur when the anchor peg is physically driven through the aluminum plate by the sole application of pressure take place in the aluminum plate W1 in the vicinity of and around the metal peg being pushed.

Thus, in the practice of the method of the present invention in which the dissimilar metal plate members are joined together by the supply of the electric current between the lower and upper electrodes 1 and 2, a standard spot welding machine may be employed with slight modifications required, i.e., formation of the peg seat 8 on the lower welder electrode 1 and providing the control unit with capabilities of adjusting the length of time during which the electric current is supplied and the value of the electric current so supplied.

It is to be noted that the timing at which the piercing process completes and the welding process should be initiated can be determined by any suitable method, for example, by setting a predetermined required for the piercing process to complete, which may be determined experimentally, in the welder control unit, detecting change in current flowing across the plate assembly, or by detecting change in pressure applied through the anchor peg W3, or a combination thereof.

Since in the practice of the method of the present invention, the welding current varying in two stages is employed, that is, the welding current employed so as to flow between the lower and upper electrodes 1 and 2 is, during the piercing process, of a value lower than that required during the welding process and is then, during the welding process, increased as shown in FIG. 3, the current value for each of those processes can be properly maintained. More specifically, if the welding current of an equal value is employed for each of the piercing and welding processes, this consistent welding current would be so excessively high for the piercing process that considerable binding reaction may take place between the anchor peg W3 and the aluminum plate W1 to eventually form an intermetallic compound liable to reduction in strength and expulsion and surface flash may also occur. On the other hand, this consistent welding current would be so relatively low for the welding process that weld defects may result in. In contrast thereto, in the present invention, since the current value for each of the piercing and welding processes can be properly maintained as discussed above, the above discussed problems can be eliminated, making it possible to accomplish a firm interlock between the aluminum and iron plates W1 and W2 by means of the anchor peg W3 with high bond strength, even though the plates so joined are of dissimilar material, without being accompanied by generation of expulsion and surface flash.

Figure 2:
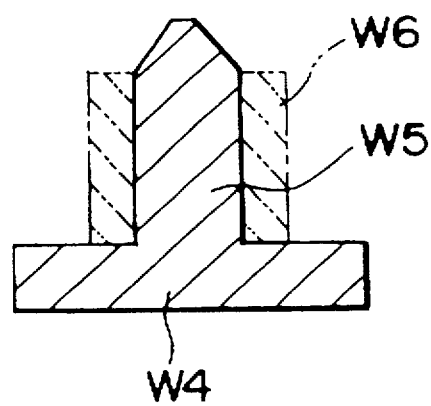
FIG. 2 is a schematic longitudinal sectional view, on an enlarged scale, showing a metal anchor peg employed in the practice of the method of the present invention.

The anchor peg W3 which may be employed in the practice of the method of the present invention may have a tubular protective sheath shown by the phantom W6 line in FIG. 2 and made of the same material as that of the iron plate W2. Where the tubular protective sheath W6 is employed, it should be mounted on a body of the connecting portion W5 which contacts the aluminum plate W1 during the piercing process. The use of the tubular protective sheath W6 is particularly advantageous in that during the piercing process the protective sheath W6 can preferentially react with the aluminum plate W1 surrounding such protective sheath W6 and, therefore, the reaction which would occur between the anchor peg W3 and the aluminum plate W1 can be suppressed. This means that any possible formation of an intermetallic compound between the anchor peg W3 and the aluminum plate W1 can be advantageously suppressed to permit the bond strength to be increased.

Instead of the use of the tubular protective sheath W6, an outer peripheral surface of the body of the connecting portion W5 of the anchor peg W3 may be electroplated so that the resultant electroplated layer can suppress formation of the intermetallic compound which would occur when reaction takes place between the anchor peg W3 and the aluminum plate W1 during the piercing process.

In the foregoing description of the preferred embodiment of the present invention, reference has been made to the joining method including the two steps, i.e., the piercing and welding processes, both employing the equal pressure applied to the anchor peg W3. However, in a broad aspect of the present invention, different pressures may be employed one for each of the piercing and welding process should the necessity occur.

Furthermore, in the foregoing description, while the plate assembly including the anchor peg W3 is sandwiched under pressure between the lower and upper welder electrodes 1 and 2 the piercing and welding processes has been described as successively carried out one after another. However, where the welding current to be supplied between the lower and upper electrodes 1 and 2 cannot be adjusted in two stages as discussed above for the piercing and welding processes, respectively, the plate assembly including the aluminum and iron plates W1 and W2 and the anchor peg W3 may be temporarily removed from the welder electrodes 1 and 2 after completion of the piercing process and may then be remounted so as to be sandwiched under pressure between the welder electrodes 1 and 2 after the welding current has been adjusted to the higher welding current.

Figure 5A:
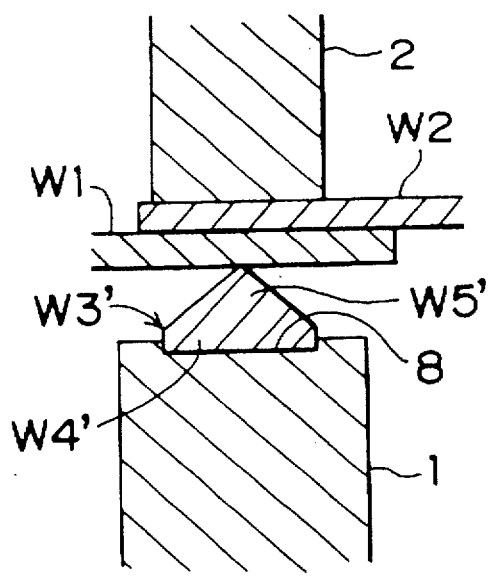
FIGS. 5A and 5B are views similar to FIGS. 1A and 1B, respectively, showing the use of a modified form of the anchor peg.
Figure 5B:
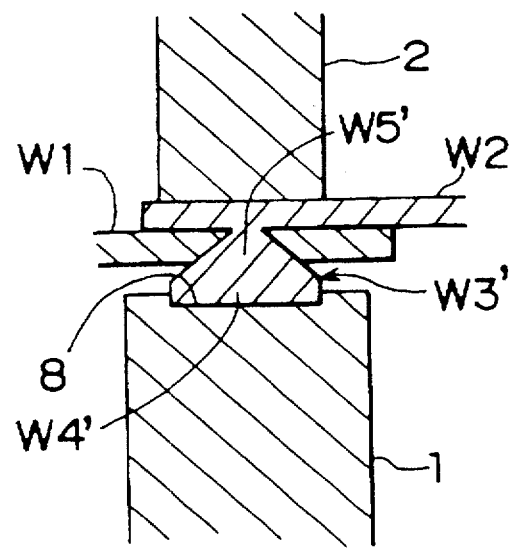
Figure 6:
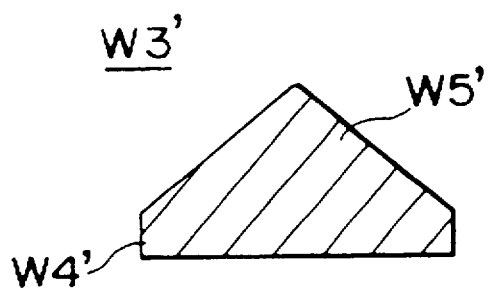
FIG. 6 is a schematic longitudinal sectional view, on an enlarged scale, showing the modified anchor peg shown in FIGS. 5A and 5B.
Figure 7:
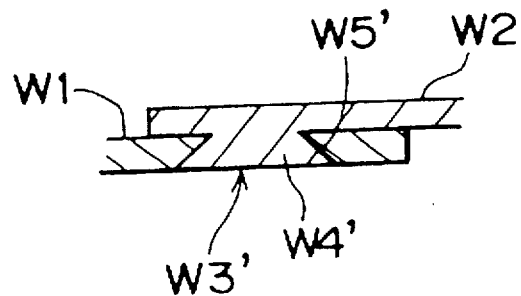
FIG. 7 is a schematic sectional view of the first and second plate members joined together by the use of the modified anchor peg shown in FIG. 6.

The anchor peg W3 which can be employed in the practice of the present invention may not be limited to the particular shape shown and described with reference to FIG. 2 and may have such a shape as shown in FIGS. 5, 6 and 7.

In the example shown in FIG. 5 and 6, the anchor peg W3' has a connecting portion W5' of a shape as best shown in FIG. 6, having a base of a diameter equal to that of the flange W4' and continued therefrom so as to terminate at a tapered tip. The anchor peg W3' of this type is of a generally conical shape.

When the anchor peg W3' is employed and when the plate assembly including the aluminum and iron plates W1 and W2 are disposed and sandwiched under pressure between the lower and upper welder electrodes 1 and 2 so as to rest on the tapered tip of the anchor peg W3' as shown in FIG. 5A, the connecting portion W5' of the anchor piece W3' is resistance-heated to melt that portion of the aluminum plate W1 aligned with the anchor peg W3' during the piercing process and, accordingly, the aluminum plate W1 can be pierced by the anchor peg W3'.

Subsequently, the welding process takes place after the tapered tip of the connecting portion W5' of the anchor peg W3' has been brought into contact with the iron plate W2, and, as shown in FIG. 5B, the tapered tip of the connecting portion W5' of the anchor peg W3' is resistance-welded to the iron plate W2 to complete a firm connection of the aluminum plate W1 with the iron plate W2 through the anchor peg W3' in a manner similar to that described in connection with the foregoing embodiment. Even the use of the anchor peg W3' brings about function and effects similar to those brought about by the use of the anchor peg W3.

Specifically, where the anchor peg W3 is of the type wherein the flange W4 is integral with the shank W5 as shown in FIGS. 1 and 2, it appears that a premature contact of the flange W4 with the aluminum plate W1 before the shank 5 is sufficiently welded to the iron plate W2 would result in that the electric current may be distributed to the aluminum plate W1 through the flange W4 and the welding process would be completed with no further welding of the shank W5 taking place.

In contrast thereto, the anchor peg W3' is of a generally conical shape with the connecting portion W5' tapering outwardly as a whole so as to converge at a point distant from the flange W4'. Therefore, when the anchor peg W3' is employed and when the aluminum plate W1 is sandwiched between the anchor peg W3' and the iron plate W2 at the time of completion of the welding process, as shown in FIG. 5B, a certain margin can be provided for at the position at which the welding terminates and the aluminum plate W1 can be stably sandwiched at any position of the tapering connecting portion W5', making it possible to secure a stabilized bond strength.

The anchor peg W3' may, as shown in FIG. 7, be embedded in the aluminum plate W1 until a bottom surface of the flange W4' (i.e., a surface remote from the connecting portion W5') is brought into flush with the undersurface of the aluminum plate W1, in which case no portion of the anchor peg W3' would protrude outwardly from the undersurface of the aluminum plate W1 to thereby provide a comfortable-to-look finish.

Thus, the present invention is directed to the joining method for joining first and second dissimilar metal plate members together by means of at least one anchor peg made of the same material as that for the second metal plate member, wherein a portion of the first metal plate member aligned with the anchor peg is first melted by resistance heating to allow the anchor peg to be pierced across the thickness of the first metal plate member, followed by welding of the anchor peg to the second plate member. In the description made hereinbefore, the first and second dissimilar metal plate members has been shown and described as held in contact with each other throughout both of the piercing and welding processes. However, a gap may be provided between the first and second dissimilar metal plate members as will now be described with reference to FIGS. 8 to 11.

In the description that follows, the first metal plate member is assumed to be a plate member of aluminum system, for example, an aluminum plate as indicated by Q, and the second metal plate member is assumed to be a ferrous plate member, for example, an iron plate as indicated by P. Also, the joining method described with reference to FIGS. 1 to 7 and the welding machine shown in FIG. 4 may be employed even though a gap S is present between the aluminum plate Q and the iron plate P.

Figure 8:
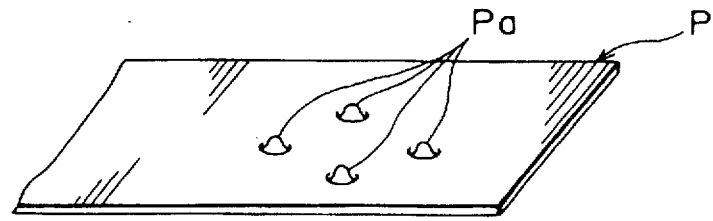
FIG. 8 is a schematic perspective view showing the second plate member formed with surface protuberances.
Figure 9:
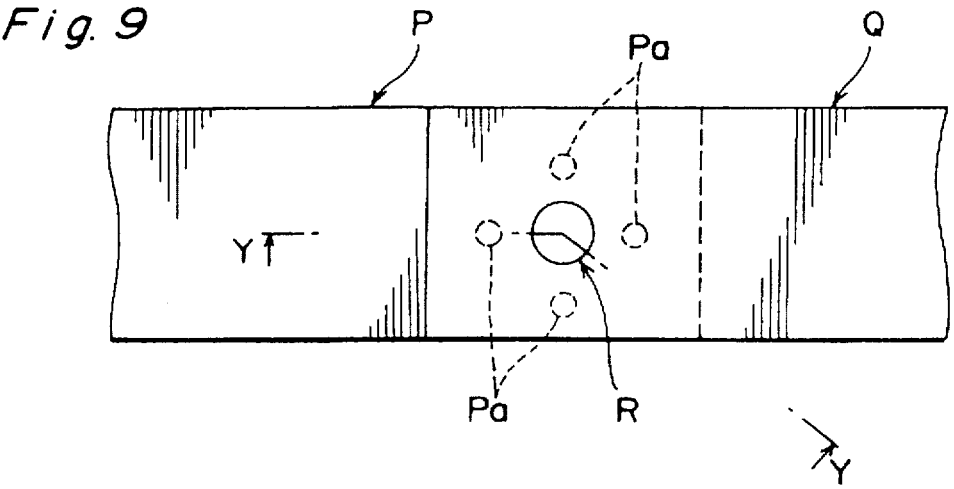
FIG. 9 is a schematic top plan view of the first and second plate members joined together with the surface protuberances intervening therebetween.
Figure 10:
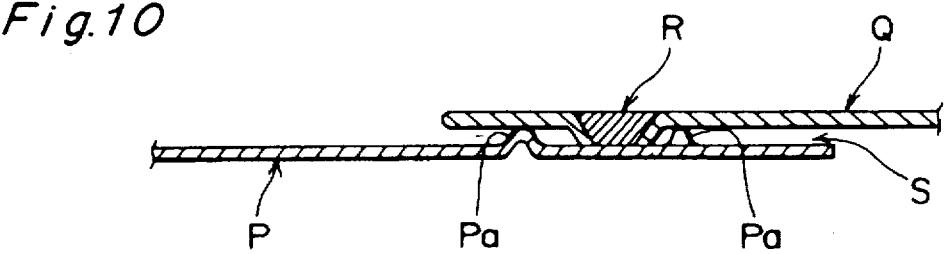
FIG. 10 is a cross-sectional view taken along the line Y—Y in FIG. 9.
Figure 11:
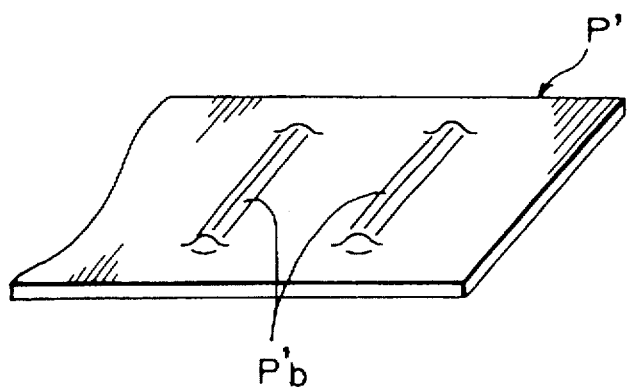
FIG. 11 is a view similar to FIG. 8, showing different types of surface protuberances formed on the second plate member.

Referring now to FIGS. 8 to 10, an area of at least one of the iron and aluminum plates P and Q, for example, the iron plate P, which is to be overlapped with a corresponding area of the other of the iron and aluminum plates, that is, the aluminum plate Q, is formed with a plurality of surface protuberances of a predetermined height. In the example shown therein, the surface protuberance are in the form of a plurality of, for example, four, surface spikes Pa which can be formed by the use of any suitable method, for example, a press work at a stage preceding the joining stage, i.e., before the aluminum and iron plates Q and P are joined together.

As best shown in FIG. 9, the surface spikes Pa are so formed on the iron plate P so as to surround that portion of the iron plate P where the anchor peg, now indicated by R, is welded. Preferably, those surface spikes Pa are equally spaced from each other in a direction generally circumferentially of that portion of the iron plate P so that the overlapping areas of the respective aluminum and iron plates Q and P can, when joined together in the manner hereinbefore described, have a substantially uniform size of the gap S therebetween. It is to be noted that the anchor peg R shown in FIG. 10 is of a shape identical with that shown in FIG. 7 and, however, it may have a shape shown in any one of FIGS. 2 and 6.

Each of the surface spikes Pa that define the gap S between the respective overlapping areas of the aluminum and iron plates Q and P when the aluminum and iron plates Q and P have been joined together has a height in terms of the distance of protrusion from the surface of the iron plate P which is of a size sufficient to allow a paint material to penetrate into such gap S during the subsequent painting process. Preferably, the height of each surface spikes Pa is at least 0.3 mm and preferably about 0.5 mm.

Where the plate assembly having the gap S defined between the dissimilar metal plate members is employed as a panel member for, for example, a part of the automobile body structure, the paint material is applied to at least one of the plate members P and Q. During this painting stage, the paint material penetrates into the gap S to eventually form a paint layer filling up the gap S. The presence of the paint layer within the gap S is particularly effective to avoid any possible occurrence of electrolytic corrosion.

In the foregoing description made with reference to FIGS. 8 to 10, the surface protuberances have been in the form of the surface spikes. However, instead of the surface spikes Pa, the surface protuberances may be in the form of at least two ridges P'b which extend a distance in parallel relation to each other. Where the ridges P'b are employed, each ridge P'b may have one or more cutouts or slots defined therein so as to extend across the thickness of the iron plate P in a direction transverse of the lengthwise direction of such ridge P'b so that the paint material can smoothly penetrate into the gap S through the cutouts.

According to a broad aspect of the present invention, each of the surface protuberances has been shown and described as used in the form of the surface spike or ridge. However, any surface protuberances may be employed as far as the gap S can be formed between the dissimilar metal plate members which are eventually joined together by the use of one or more anchor pegs.

Although the present invention has been described in connection with the preferred embodiments thereof with reference to the accompanying drawings, it is to be noted that various changes and modifications are apparent to those skilled in the art. For example, although the dissimilar metal plate members have been shown and described as employed in the form of aluminum and iron plates, dissimilar metal materials for the plate members may not be always limited to aluminum and iron, respectively, but any other dissimilar metals may be employed. By way of example, where a striker for locking the automobile bonnet to a part of the automobile body structure is to be joined to the automobile bonnet, and assuming that the automobile bonnet is prepared from a metallic plate of an aluminum system such as, for example, an Al-Mg alloy, and the striker is in the form of a ferrous plate, for example, an iron plate, electroplated with an Zn-Ni alloy, the striker can be satisfactorily joined to the automobile bonnet. Moreover, the present invention can be equally applicable to joining of a ferrous plate member to a dissimilar metal plate member having an electroconductive property, for example, a plate member of a magnesium system.

Accordingly, such changes and modifications are to be understood as included within the scope of the present invention as defined by the appended claims, unless they depart therefrom.

What is claimed is:

1. A method of joining a first electroconductive plate member to a second electroconductive plate member, said first and second plate members being prepared from respective metals dissimilar from each other, by the use of at least one anchor peg made of the same metal as the second plate member, said method comprising the steps of:

overlapping the first and second plate members one above the other to provide a plate assembly;

clamping the plate assembly under pressure between welding electrodes with the anchor peg positioned between one of the welding electrodes and the first plate member;

applying an electric current to the welding electrodes to initially cause a portion of the first plate member held in contact with the anchor peg to melt by resistance-heating of the anchor peg to thereby allow the anchor peg to be pierced through the first plate member and then to cause the anchor peg extending completely across a thickness of the first plate member to be welded to the second plate member.

2. The joining method as claimed in claim 1, wherein said electric current is adjusted to provide a piercing current of a first value necessary to cause the anchor peg to be pierced through the first plate member and a welding current of a second value necessary to cause the anchor peg to be welded to the second plate member.

3. The joining method as claimed in claim 1, wherein said first plate member is made of aluminum and said second plate member is made of iron.

4. The joining method as claimed in claim 1, wherein said anchor peg has a portion which contacts the first plate member when the anchor peg is pierced through the first plate member, said portion of the anchor peg being electroplated.

5. The joining method as claimed in claim 1, wherein said anchor peg has a portion which contacts the first plate member when the anchor peg is pierced through the first plate member, and further comprising a tubular protective sheath mounted on said portion of the anchor peg.

6. The joining method as claimed in claim 1, further comprising a step of forming a plurality of surface protuberances on one of opposite surfaces of one of the first and second plate members, said forming step being carried out prior to the overlapping step.

7. The joining method as claimed in claim 6, wherein said first and second plate members are made of aluminum and ferrous materials, respectively.

8. The joining method as claimed in claim 6, wherein said surface protuberances are formed on the surface of the second plate member.

9. The joining method as claimed in any one of claims 6 to 8, wherein said forming step is carried out by the use of a press work.

10. The joining method as claimed in any one of claims 6 to 8, further comprising a step of applying a paint material to at least one of the first and second plate members, said paint applying step being carried out after the first and second plate members have been joined together by means of the anchor peg.

11. The joining method as claimed in claim 9, further comprising a step of applying a paint material to at least one of the first and second plate members, said paint applying step being carried out after the first and second plate members have been joined together by means of the anchor peg.

12. A welding apparatus for joining a first electroconductive plate member to a second electroconductive plate member, said first and second plate members being prepared from respective metals dissimilar from each other, by the use of at least one anchor peg made of the same metal as the second plate member, said apparatus comprising:

first and second welding electrodes supported for movement close to and away from each other, said first welding electrodes having a peg seat defined therein for receiving the anchor peg therein;

a drive means for driving the first and second welding electrodes to move close to each other with the first and second plate members sandwiched between the second welding electrode and the anchor peg received in the first welding electrode;

a power supply control means for applying an electric current of a controlled magnitude for a controlled duration to the first and second welding electrodes to initially cause a portion of the first plate member held in contact with the anchor peg to melt by resistance-heating of the anchor peg to thereby allow the anchor peg to be pierced through the first plate member and then to cause the anchor peg extending completely across a thickness of the first plate member to be welded to the second plate member.

13. The welding apparatus as claimed in claim 12, wherein said power supply control means has a capability of adjusting the electric current to provide a piercing current of a first value necessary to cause the anchor peg to be pierced through the first plate member and a welding current of a second value necessary to cause the anchor peg to be welded to the second plate member.

* * * * *